(12) United States Patent
Olsen et al.

(10) Patent No.: US 11,700,973 B2
(45) Date of Patent: Jul. 18, 2023

(54) COOKWARE UTENSIL SYSTEM

(71) Applicant: Lagom Kitchen Co., Culver City, CA (US)

(72) Inventors: Melinda Olsen, Los Angeles, CA (US); Amir Tehrani, Los Angeles, CA (US); Zachary Rosner, Los Angeles, CA (US); Christopher Santone, Brooklyn, NY (US); Hlynur Atlason, New York, NY (US)

(73) Assignee: LAGOM KITCHEN CO., Culver City, CA (US)

( * ) Notice: Subject to any disclaimer, the term of this patent is extended or adjusted under 35 U.S.C. 154(b) by 0 days.

(21) Appl. No.: 17/569,600

(22) Filed: Jan. 6, 2022

(65) Prior Publication Data
US 2022/0322886 A1    Oct. 13, 2022

Related U.S. Application Data

(63) Continuation of application No. PCT/US2021/035497, filed on Jun. 2, 2021, which is a continuation-in-part of application No. 29/778,312, filed on Apr. 12, 2021.

(51) Int. Cl.
*A47J 43/28* (2006.01)
*A47G 21/04* (2006.01)

(52) U.S. Cl.
CPC ............ *A47J 43/287* (2013.01); *A47G 21/04* (2013.01)

(58) Field of Classification Search
CPC ....... A47J 43/287; A47G 21/04; A47G 21/14; A47G 21/145

USPC .................................... 248/213.2; 220/573.1
See application file for complete search history.

(56) References Cited

U.S. PATENT DOCUMENTS

| | | | |
|---|---|---|---|
| 721,249 A | * | 2/1903 | Stimson ................. A47G 21/02 |
| | | | 30/322 |
| 1,373,371 A | | 3/1921 | Vierling et al. |
| 1,403,274 A | | 1/1922 | Springer |
| 1,435,890 A | | 11/1922 | Bothe |
| D61,869 S | | 2/1923 | Bothe |
| D117,625 S | | 11/1939 | Brandt |
| D159,989 S | | 9/1950 | Jones |
| D234,017 S | | 12/1974 | Christian et al. |
| D238,316 S | | 1/1976 | Kahn |

(Continued)

FOREIGN PATENT DOCUMENTS

| | | |
|---|---|---|
| HK | 2118392-0001 | 7/2021 |
| WO | 2006/100367 A1 | 9/2006 |

(Continued)

OTHER PUBLICATIONS

International Search Report issued by the Russian Federal Institute of Industrial Property for corresponding International Patent Application No. PCT/US2021/035497, dated Nov. 25, 2021, with an English translation.

(Continued)

*Primary Examiner* — Andrew D Perreault
(74) *Attorney, Agent, or Firm* — Banner & Witcoff, Ltd.

(57) ABSTRACT

A cookware utensil system having at least one cookware further comprising a cookware body with a perimetric edge and at least one handle extending outwardly from the cookware body, and a utensil having at least one notch that is configured to engage with the at least one handle.

8 Claims, 8 Drawing Sheets

(56) References Cited

U.S. PATENT DOCUMENTS

| | | | |
|---|---|---|---|
| D242,299 S | 11/1976 | Kahn | |
| D289,564 S | 4/1987 | Hartford | |
| D459,148 S | 6/2002 | Richied et al. | |
| D465,336 S | 11/2002 | Zemel | |
| D466,390 S | 12/2002 | Hung | |
| D491,419 S | 6/2004 | White et al. | |
| D566,460 S | 4/2008 | Zemel | |
| D572,079 S | 7/2008 | Zemel | |
| D572,080 S | 7/2008 | Zemel | |
| D579,668 S | 11/2008 | Zemel | |
| D601,849 S | 10/2009 | Zemel | |
| D617,156 S | 6/2010 | Griffith | |
| D719,790 S | 12/2014 | Grcic | |
| D778,706 S | 2/2017 | Atkins | |
| D780,254 S | 2/2017 | Clissold | |
| D790,864 S | 7/2017 | Zemel et al. | |
| D873,518 S | 1/2020 | Chavez et al. | |
| D891,786 S | 8/2020 | Robbins | |
| D897,788 S | 10/2020 | Wang | |
| 11,253,092 B1 * | 2/2022 | Wilson | F16M 11/041 |
| D959,933 S | 8/2022 | Tehrani et al. | |
| 2007/0289981 A1 * | 12/2007 | Shaw | A47J 43/288 220/735 |
| 2007/0295730 A1 * | 12/2007 | Marin | B21D 51/22 220/573.1 |
| 2013/0037553 A1 | 2/2013 | Bourbeau et al. | |

FOREIGN PATENT DOCUMENTS

| | | | |
|---|---|---|---|
| WO | 2006100367 A1 | 9/2006 | |
| WO | 2011/070601 A1 | 6/2011 | |
| WO | 2011070601 A1 | 6/2011 | |

OTHER PUBLICATIONS

Written Opinion of the International Searching Authority issued by the Russian Federal Institute of Industrial Property for corresponding International Patent Application No. PCT/US2021/035497, dated Nov. 25, 2021, with an English translation.

Classic French Beechwood Spoon, posted on Oct. 7, 2007 [online], [retrieved on Sep. 9, 2022]. Retrieved on internet,<http://www.amazon.com/Classic-French-Beechwood-Spoon-8-Inches/dp/B001B8HPZ8> (Year: 2007).

Our Place Beechwood Spoons, posted on May 22, 2022 [online], [retrieved on Sep. 9, 2022]. Retrieved on internet, https://fromourplace.com/products/beechwood-spoons?variant=41543357104322 (Year: 2022).

30 Pieces Mini Wooden Spoon, posted on May 21, 2020 [online], [retrieved on Sep. 9, 2022]. Retrieved on internet, https://www.amazon.com/Pieces-Serving-Condiments-Teaspoon-Seasoning/dp/B088ZKZHHW?th=1(Year: 2020).

Wooden Ladle, posted on Jan. 24, 2021 [online], [retrieved on Sep. 9, 2022]. Retrieved on internet, https://bsaunasusa.com/product/wooden-ladle-52cm-cedar/ (Year: 2021).

4 Pieces Wood Mixing Spoon, posted on May 16, 2019 [online], [retrieved on Sep. 9, 2022]. Retrieved on internet, https://www.amazon.com/Pieces-Mixing-Kitchen-Stirring-Cooking/dp/B07RXJ6DDG?th=1 (Year: 2019).

Nov. 25, 2021—(WO) International Search Report & Written Opinion—PCT/US2021/035497.

* cited by examiner

COOKWARE UTENSIL SYSTEM

CROSS-REFERENCE TO RELATED APPLICATIONS

This application is a continuation application of International Application PCT/US2021/035497 filed on Jun. 2, 2021, which is a continuation-in-part of U.S. application Ser. No. 29/778,312, filed Apr. 12, 2021, the contents of each of which are incorporated by reference herein.

FIELD OF THE INVENTION

The present disclosure relates to cookware generally, and more specifically to a cookware utensil system.

BACKGROUND

Cookware utensils in the nature of spoons, spatulas, ladles and the like, are typically used with cookware in a temporary fashion, such as when stirring or moving food around in a pot or pan. When not engaged with cookware, a utensil is typically stored in a location separate from the cookware, such as on a counter, on a special holder such as a spoon rest, on the side of a sink, or the like, which leads to dirtying a surface that will need to be cleaned. Sometimes a utensil is stored submerged in the cookware contents, or precariously balanced along a cookware handle. There is also a storage need for the utensil after use, which is commonly put in another countertop storage vessel or inside a drawer. Therefore, there is a need for a better way to manage the engagement between cookware and various utensils, such that a utensil may be engaged with the cookware and not have to be stored separately therefrom during use or thereafter.

SUMMARY

A cookware utensil system having at least one cookware further comprising a cookware body with a perimetric edge and at least one handle extending outwardly from the cookware body, and a utensil having at least one notch that is configured to engage with the at least one handle. The at least one notch is configured to engage with the cookware such that the utensil is likely to become separated therefrom while the cookware utensil is not being used to stir or manipulate the contents of the cookware or thereafter.

DETAILED DESCRIPTION OF THE PREFERRED EMBODIMENTS

Figure 1:
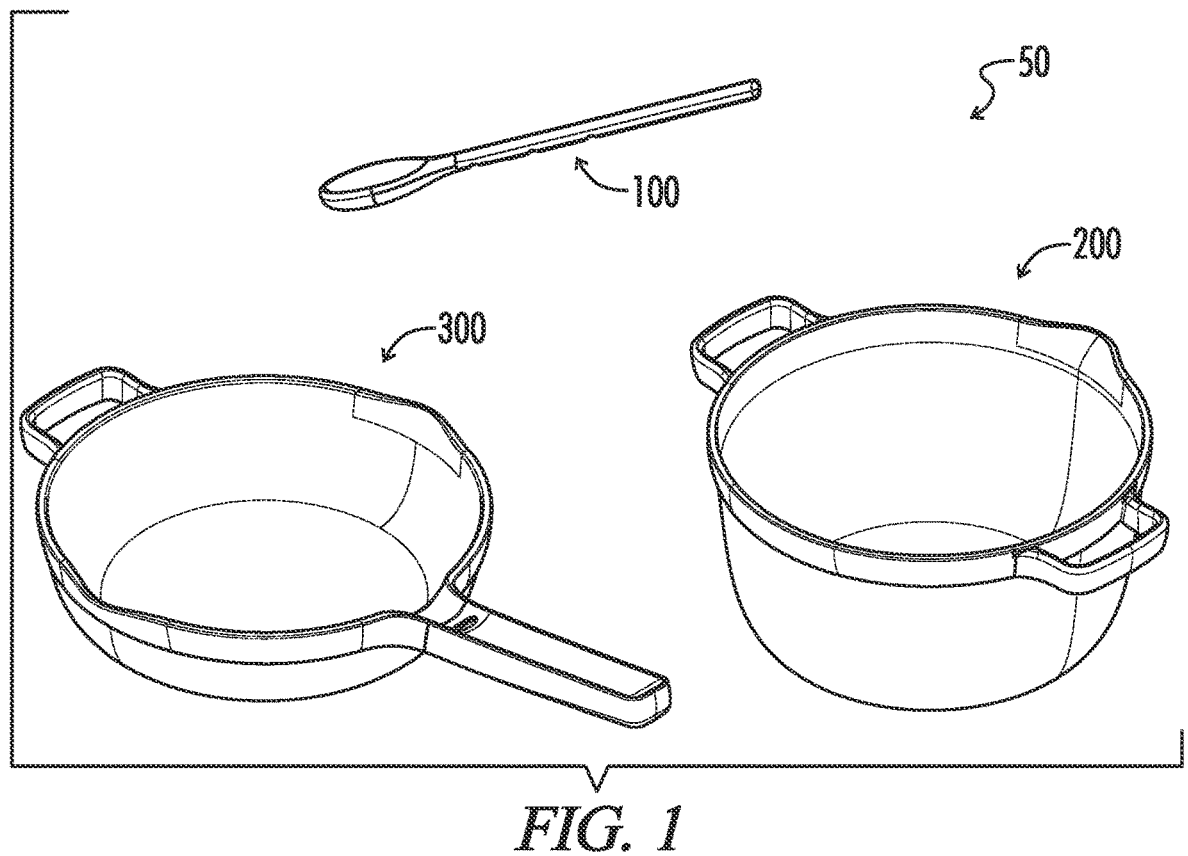
FIG. 1 illustrates one embodiment of a cookware utensil system of the present disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 illustrates a cookware utensil system 50 that is comprised generally of at least one cookware utensil 100, such as a spoon for example, that is used with one or more cookware such as a first cookware 200 in the form of a pot, for example, and a second cookware 300 in the form of a pan, for example. While the system 50 is illustrated in FIG. 1 with three elements 100, 200 and 300, it will be understood that the utensil 100 may be used separately with either the pot 200 or the pan 300, or both the pot 200 and the pan 300, or with other cookware not illustrated or described herein. In addition, while the utensil 100, pot 200 and pan 300 are illustrated with a particular shape, size, configuration, construction, depth and capacity, it will be understood that the illustrations are not limiting and that utensils and cookware of any configuration may be used.

Figure 2:
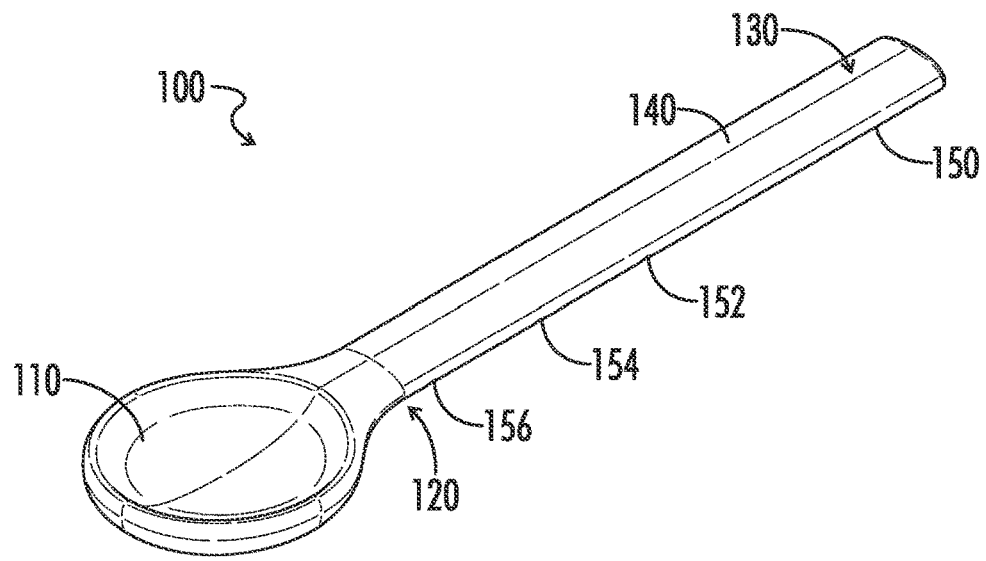
FIG. 2 is an upper perspective view of one embodiment of a cookware utensil of the present disclosure.
Figure 3:
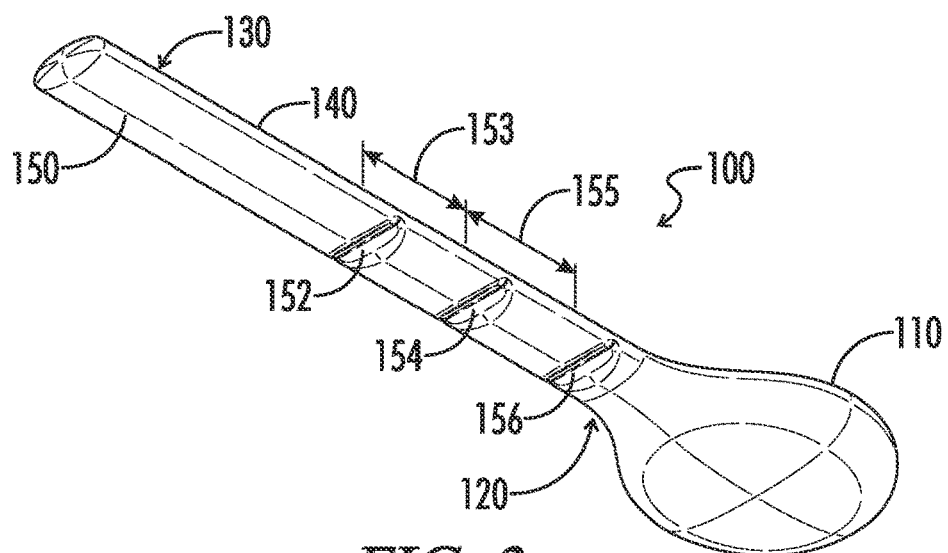
FIG. 3 is a lower perspective view of one embodiment of a cookware utensil of the present disclosure.
Figure 4:
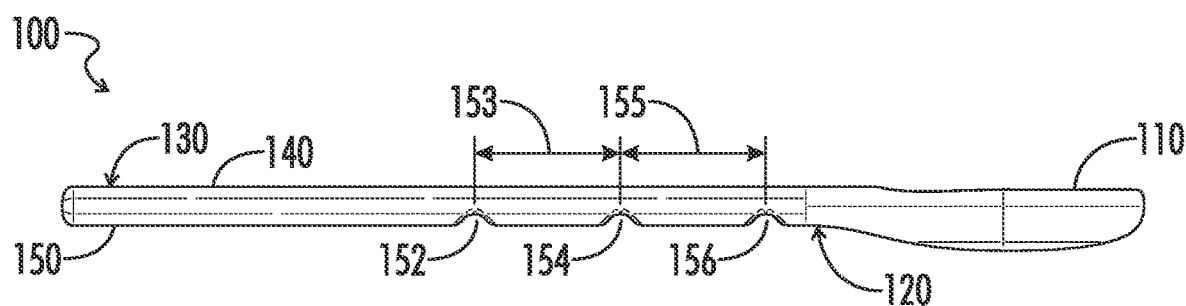
FIG. 4 is a side elevation view of one embodiment of a cookware utensil of the present disclosure.
Figure 5:
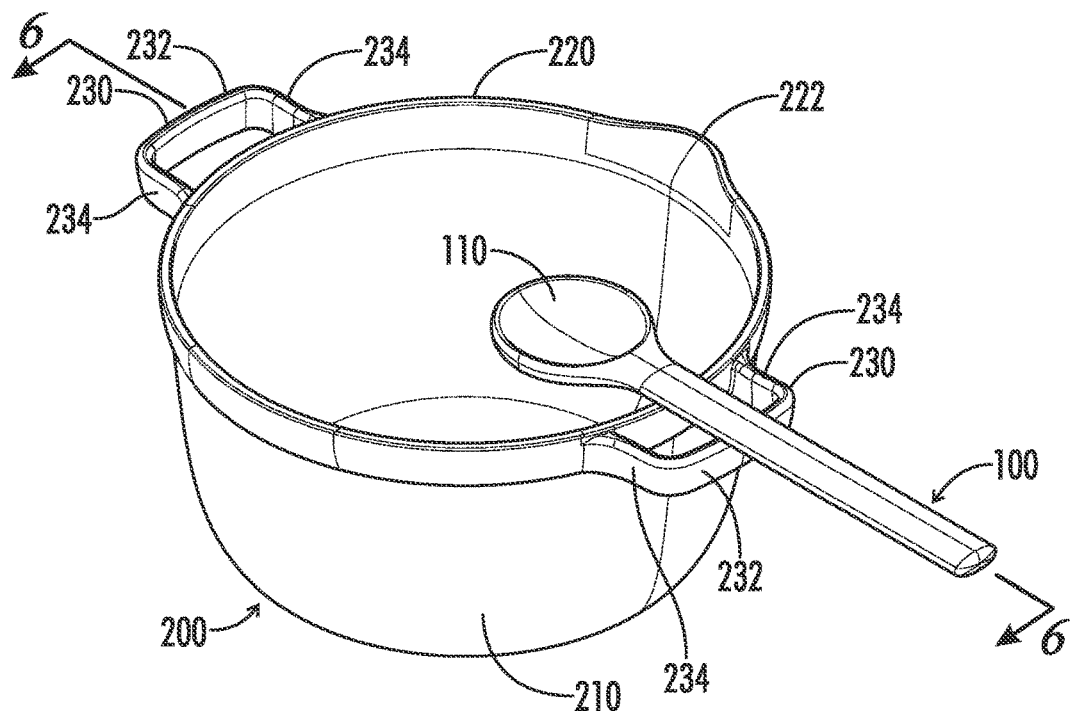
FIG. 5 illustrates one embodiment of the engagement of a cookware utensil with one embodiment of a cookware of the present disclosure.

FIG. 2 illustrates an upper perspective view, FIG. 3 illustrates a lower perspective view, and FIG. 4 illustrates a side view of one embodiment of the cookware utensil 100 comprising a head 110 and a handle 130 and a neck 120 defined between. While the head 110 is shown as a spoon, it will be appreciated that the head 110 may take the form of any cookware utensil head such as a spatula, pasta fork, ladle and the like. Other cookware utensil heads are contemplated. The handle 130 further comprises an upper surface 140 and a lower surface 150 having one or more notches 152, 154, 156 that are spaced from each other by distances 153 and 155. While three notches are illustrated in accordance with certain spacing, it will be appreciated that the utensil 100 may have only notch 152 or notch 154 or notch 156, or a combination of notch 152 and notch 154, or a combination of notch 152 and notch 156, or a combination of notch 154 and notch 156, each at similar or different spacing. Alternatively, the utensil may have more than three notches as desired, with similar or different spacing. Alternatively (not shown), the notches may be situated on the upper surface 140 instead of the lower surface 150, or both the upper and lower surfaces, or also on the side surfaces if desired. While in the illustrated embodiment, distance 153 is slightly greater than distance 155, it will be appreciated that distances 153 and 155 may be the same, or distance 155 may be greater than distance 153. The notches 152, 154, 156 are configured and spaced to engage certain features of the cookware 200, 300 as described herein.

One or more of the notches 152, 154, 156 may be used to engage the utensil 100 with the cookware 200, 300 as shown herein. FIGS. 5-9 illustrate a cookware or pot 200 comprising a cookware body or pot body 210 having a perimetric edge 220 and at least one handle 230 extending outwardly from the pot body 210, the handle further comprising an outer leg 232 that is generally parallel to the perimetric edge 220 of the pot body 210 and a pair of connecting legs 234 that connect the outer leg 232 to the pot body 210. Handle 230 is typically referred to as a helper handle as handle 230 is used to help carry the pot 200 and pour the contents (not shown) from the pot body 210 such as through a spout 222. While the pot 200 illustrated in FIGS. 5-9 comprise two helper handles 230 and a single spout 222, it will be appreciated that the pot 200 may only include a single helper handle of the same or different configuration as handle 230, or more than two helper handles 230, or no spout 222 or more than one spout 222 as desired.

Figure 6:
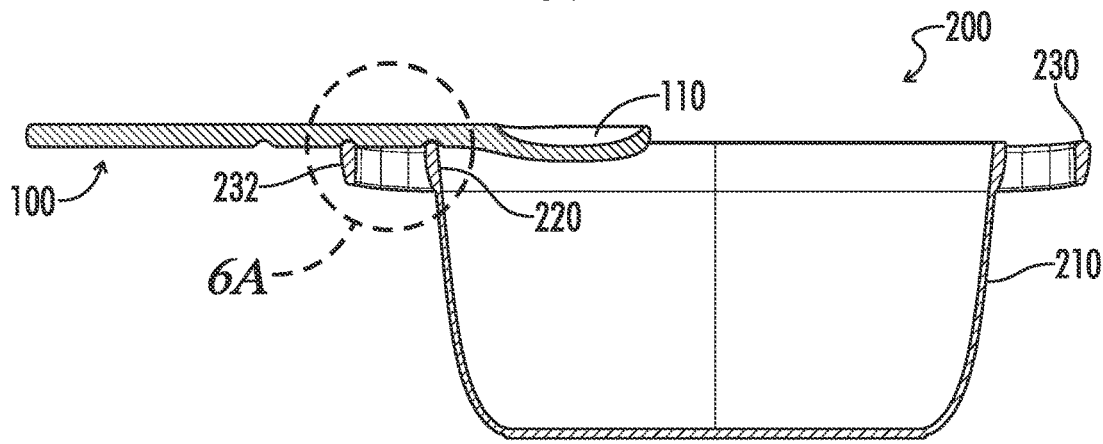
FIG. 6 is a cross-sectional view taken along line 6-6 of FIG. 5.
Figure 6A:
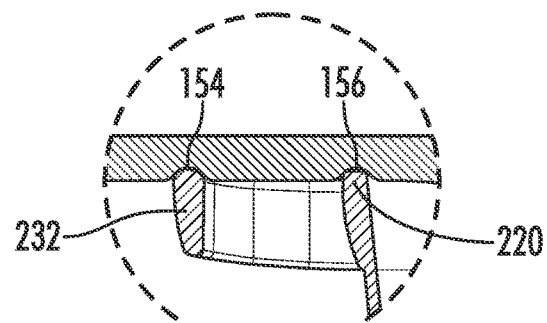
FIG. 6A is a close-up view of section 6A of FIG. 6.

FIG. 6 illustrates one embodiment of the engagement of utensil 100 with pot 200, wherein notches 154 and 156 of utensil 100 are spaced to simultaneously engage with the outer leg 232 of helper handle 230 and with the perimetric edge 220 of pot body 210 respectively, as shown in FIG. 6A, such that the utensil 100 rests across the helper handle 230 with the utensil head 110 positioned over the pot body 210 and is prevented, by virtue of the notch system, from sliding off the helper handle and into the pot body 210. In an alternative embodiment (not shown), notches 152 and 154 of utensil 100 may engage respectively with the outer leg 232 of handle 230 and with the perimetric edge 220 of pot body 210 so long as the spacing of the engaged notches is consistent with the spacing between the pot body 210 and the outer leg 232 of the handle 230.

Figure 7:
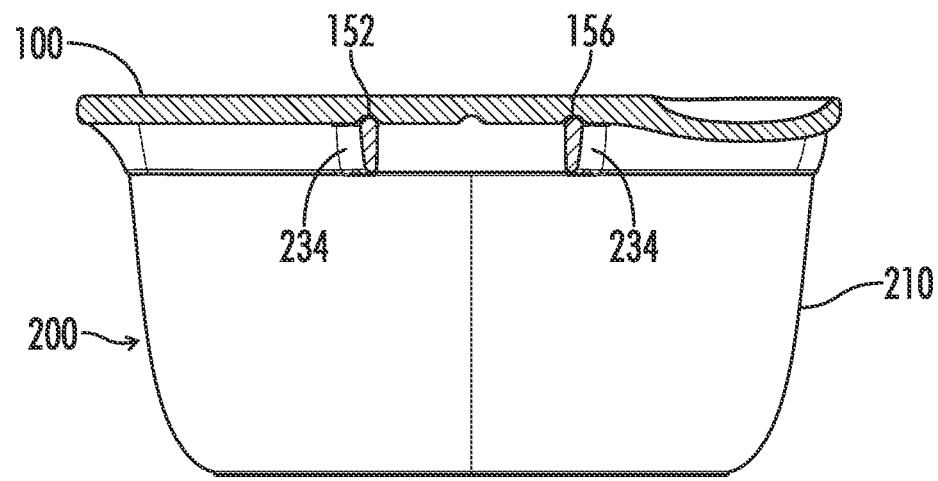
FIG. 7 illustrates one embodiment of the engagement of a cookware utensil with one embodiment of a cookware of the present disclosure.
Figure 8:
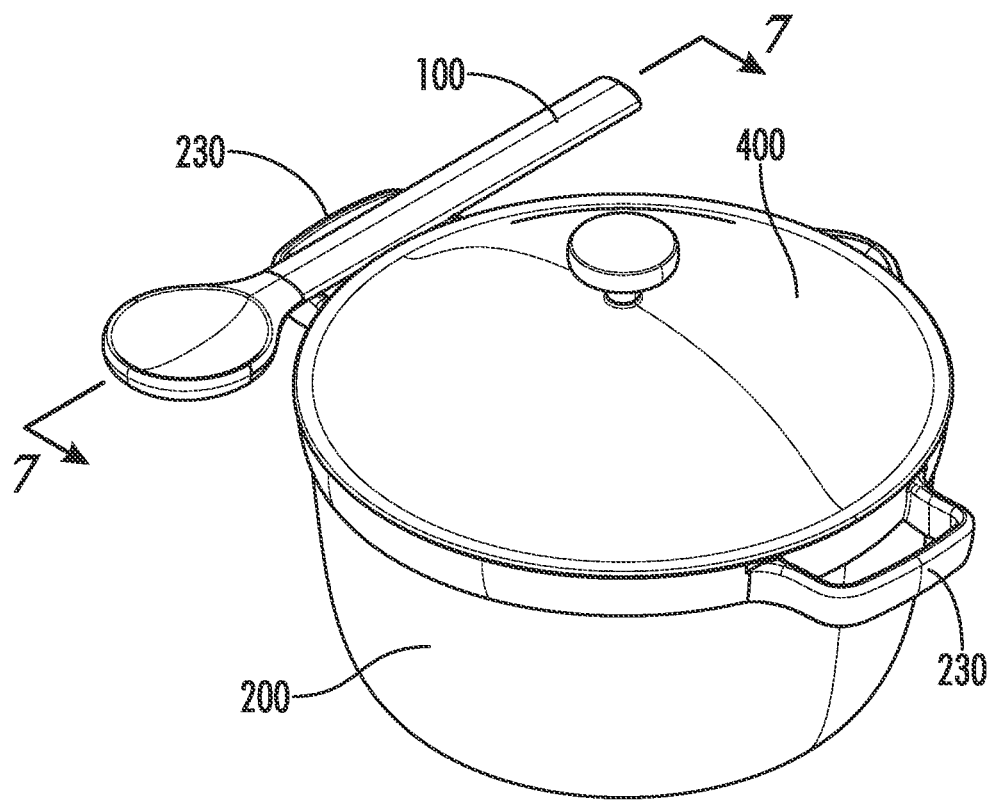
FIG. 8 illustrates one embodiment of the engagement of a cookware utensil with one embodiment of a cookware of the present disclosure.
Figure 9:
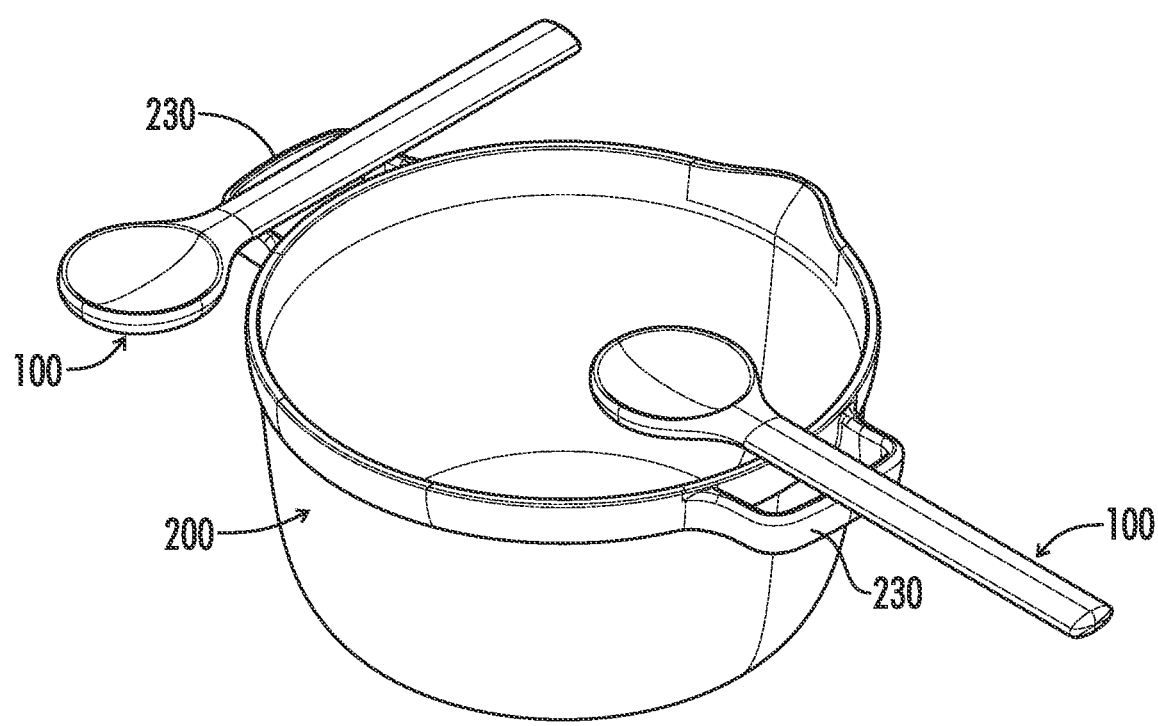
FIG. 9 illustrates one embodiment of the engagement of multiple cookware utensils with one embodiment of a cookware of the present disclosure.
Figure 10:
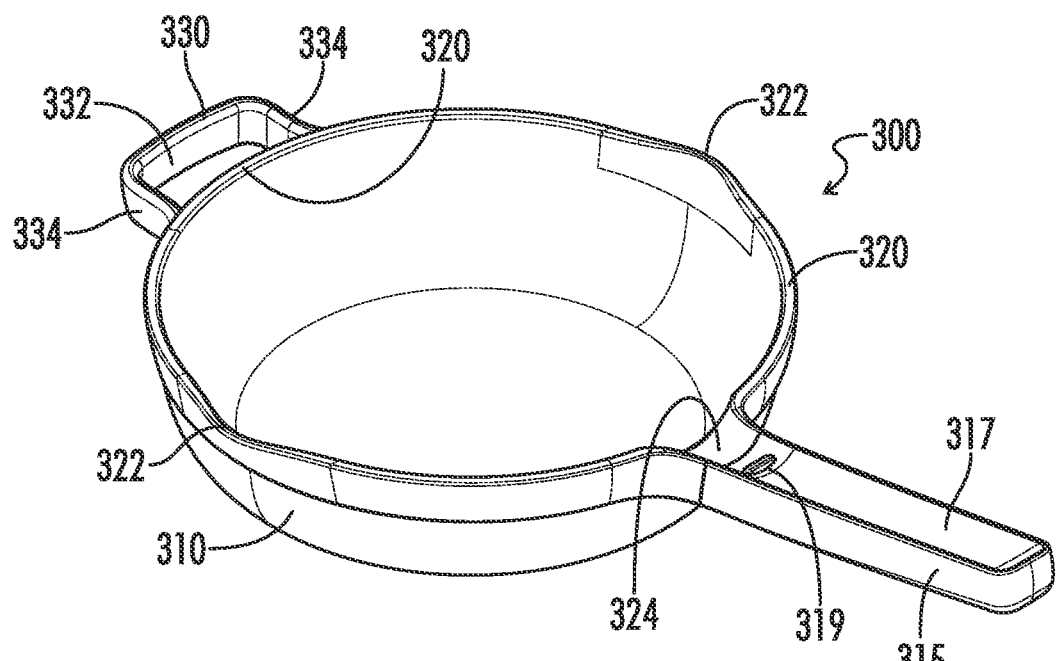
FIG. 10 is a perspective view of one embodiment of a cookware of the present disclosure.

FIG. 7 illustrates one embodiment of the engagement of utensil 100 with pot 200, wherein notches 152 and 156 of utensil 100 simultaneously engage respectively with the connecting leg 234 of handle 230 such that the utensil 100 rests across the handle 230 with the utensil 100 positioned tangentially relative to the pot body 210. This positioning of the utensil 100 relative to the handle 230 is useful in the event that a cookware lid 400 is attached to the cookware or pot 200 as shown in FIG. 8. However, if the cookware lid 400 is not attached, then it is possible to engage a plurality of utensils 100 with the handles 230 as shown in FIG. 9.

FIGS. 10-15 illustrate a cookware or pan 300 comprising a cookware body or pan body 310 having a perimetric edge 320 with one or more spouts 322, a first elongated handle 315 having an upper surface 317 and at least one node 319 positioned near an opening 324 in the perimetric edge 320, and at least one helper handle 330 extending outwardly from the pan body 310, the at least one helper handle 330 further comprising an outer leg 332 that is generally parallel to the perimetric edge 322 of the pan body 310 and a pair of connecting legs 334 that connect the outer leg 332 to the pan body 310. While the pan 300 comprises one elongated handle 315, two spouts 322 and one helper handle 330, it will be appreciated that the pan 300 may only include a different combination of such features, including not having such features, such as not having a spout 322, or not having a helper handle 330, or having additional helper handles 330, and so on.

Figure 11:
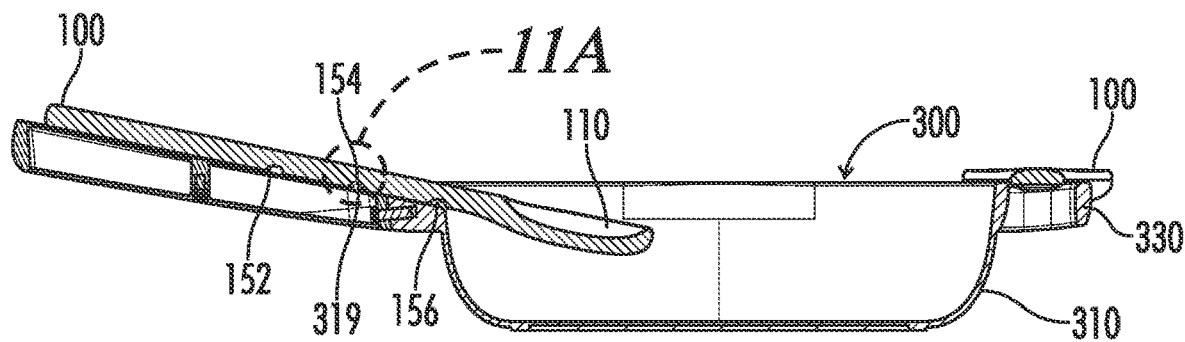
FIG. 11 illustrates one embodiment of the engagement of a cookware utensil with the cookware of FIG. 10.
Figure 11A:
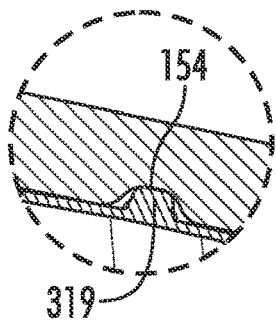
FIG. 11A is a close-up view along section 11A of FIG. 11.

FIG. 11 illustrates one embodiment of the engagement of utensil 100 with pan 300, wherein any of notches 152, 154, 156 of utensil 100 engage respectively with the at least one node 319 on the elongated handle 315. While FIG. 11 shows notch 154 engaging with node 319, it will be appreciated that either notch 152 or notch 156 could also engage with node 319. While this engagement references a notch-node engagement, it will be appreciated that other types of mating elements may be used so long as the functionality of engagement is maintained, such as a peg-hole engagement, a post and depression engagement, mating magnetic elements, a mating male and female groove engagement, a key and slot engagement, any type of male and female structural engagement, and the like. In one embodiment (not illustrated), the mating elements may be reversed such as if one or more notches were positioned on the handle 315 and one or more nodes were positioned on the utensil 100. Other configurations are contemplated. The positioning of the at least one node 319 near the opening 324 in the perimetric edge 320 is beneficial as it allows for the utensil head 110 to extend into the pan body 310 while the utensil 100 is engaged with the elongated handle 315 through the engagement of one of the notches 152, 154, 156. In the embodiments of FIGS. 11 and 11A, notch 154 is engaged with node 319. In an alternative embodiment (not shown), more than one node may be situated on the elongated handle 315 to simultaneously engage with a plurality of notches on the utensil. In a further alternative embodiment (not shown), the number of nodes on the elongated handle 315 matches the number of notches on the utensil.

Figure 12:
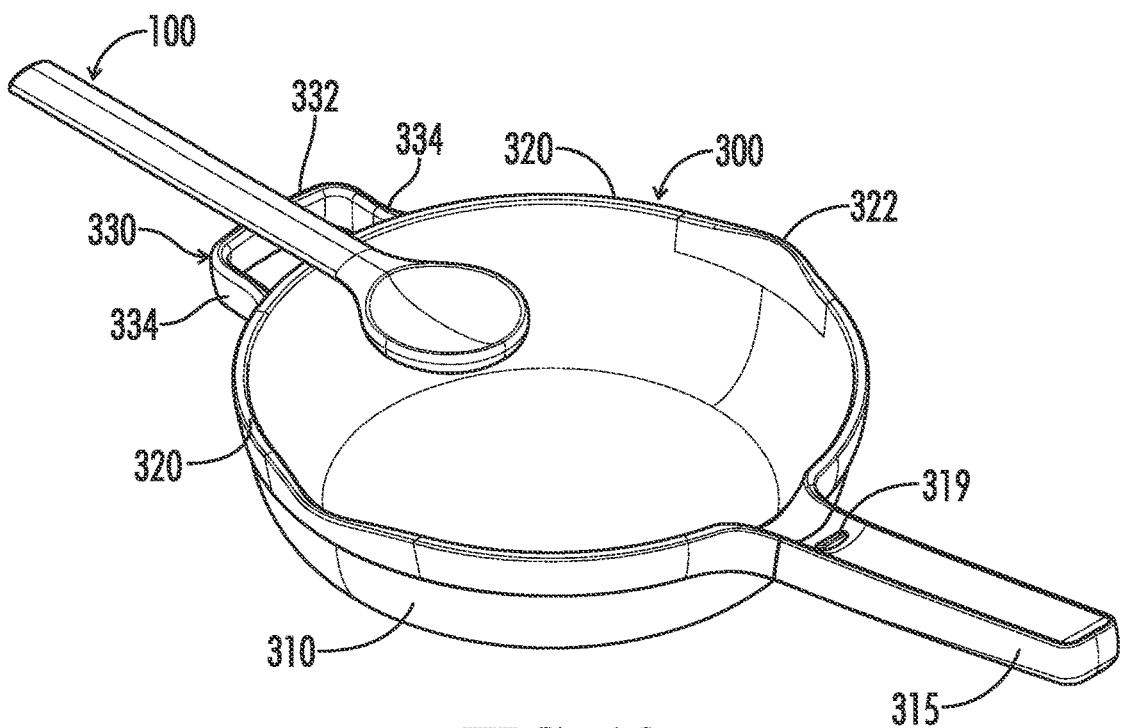
FIG. 12 illustrates one embodiment of the engagement of a cookware utensil with the cookware of FIG. 10.

FIG. 12 illustrates one embodiment of the engagement of utensil 100 with pan 300, where notches 154 and 156 simultaneously engage with the outer leg 332 of helper handle 330 and with the perimetric edge 320 of pot body 310 such that the utensil 100 rests across the helper handle 330 with the utensil head 110 positioned over the pan body 310. In an alternative embodiment (not shown), notches 152 and 154 of utensil 100 may engage respectively with the outer leg 332 of helper handle 330 and with the perimetric edge 320 of pan body 310 so long as the spacing of the engaged notches is consistent with the spacing between the pan body 310 and the outer leg 332 of the helper handle 330.

Figure 13:
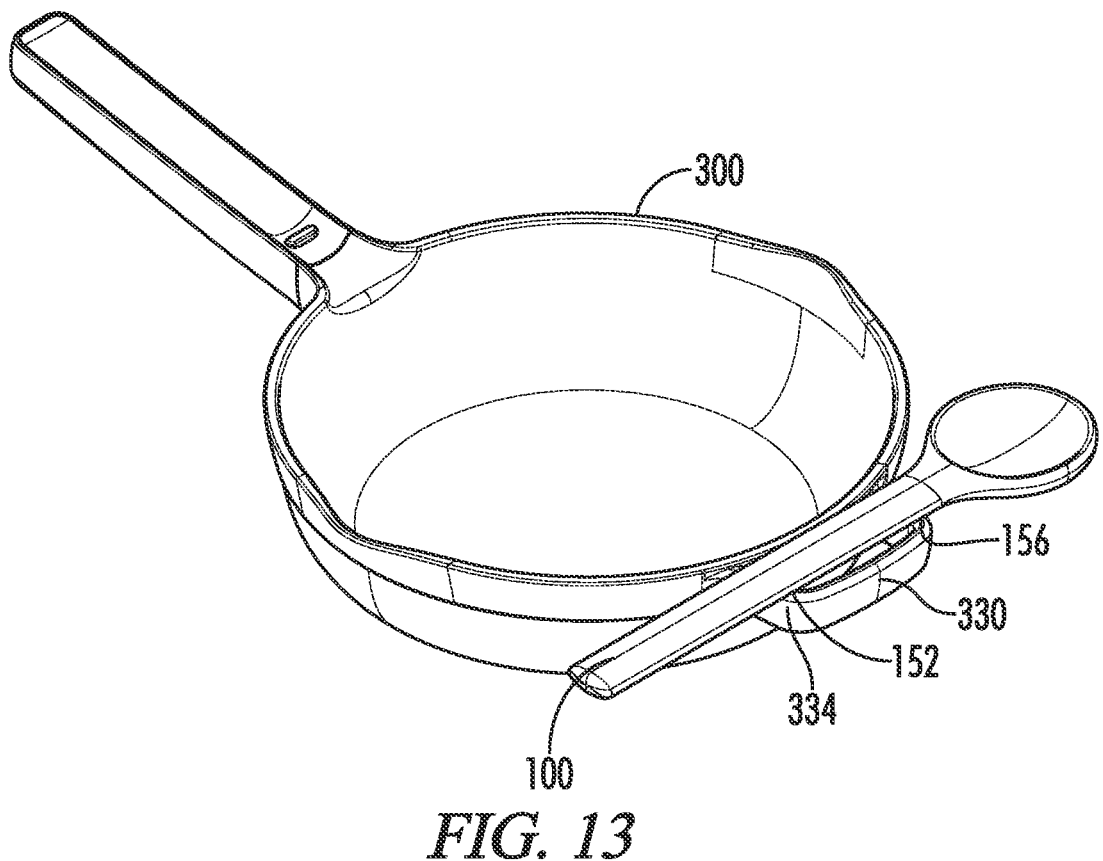
FIG. 13 illustrates one embodiment of the engagement of a cookware utensil with the cookware of FIG. 10.
Figure 14:
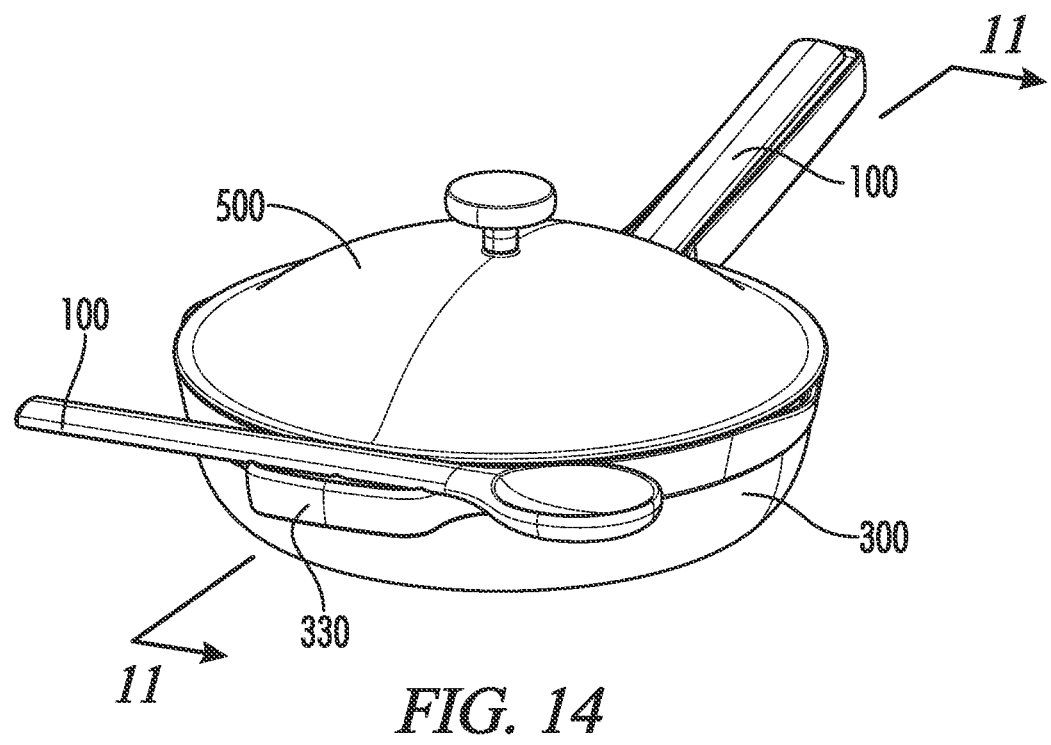
FIG. 14 illustrates one embodiment of the engagement of multiple cookware utensils a cookware of the present disclosure.
Figure 15:
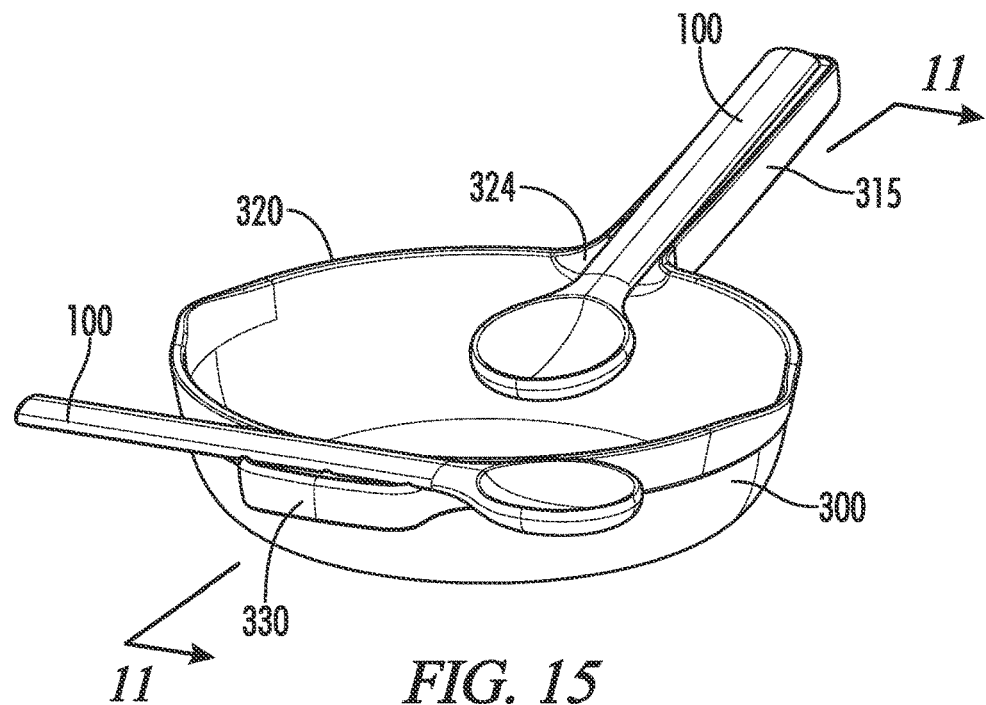
FIG. 15 illustrates one embodiment of the engagement of multiple cookware utensils with the cookware of FIG. 10.

FIG. 13 illustrates one embodiment of the engagement of utensil 100 with pan 300, wherein notches 152 and 156 of utensil 100 simultaneously engage respectively with the connecting legs 334 of helper handle 330 such that the utensil 100 rests across the helper handle 330 with the utensil 100 positioned tangentially relative to the pan body 310. This positioning of the utensil 100 relative to the helper handle 330 is useful in the event that a cookware lid 500 is attached to the cookware or pan 300 as shown in FIG. 14, wherein one utensil 100 is engaged with helper handle 330 while another utensil 100 is engaged with the elongated handle 315 such that the utensil head extends into the pan (see FIG. 11) body through the opening 324 (see FIG. 15) in the perimetric edge 320. FIG. 15 illustrates the engagement of a plurality of utensils 100 with the handles 315, 330.

Figure 16A:
FIGS. 16A through 16D illustrate alternative embodiments of cookware utensils of the present disclosure.
Figure 16B:
Figure 16C:
Figure 16D:
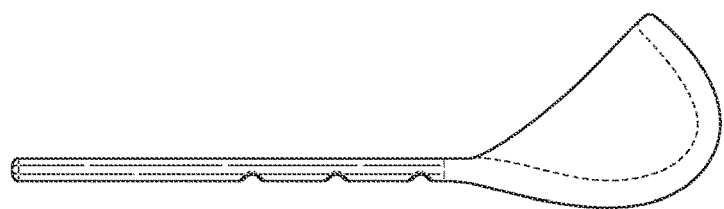

In one embodiment of the cookware utensil system 50 of the present disclosure, the same utensil 100 may be configured to engage with different cookware, such as with the helper handles 230 of the pot 200, the helper handles 330 of the pan 300, and the elongated handle 315 of the pan 300. One or more of the notches 152, 154, 156 may be used to engage with various features of each cookware such as the perimetric edge 220, 320 of each cookware 200, 300 respectively, the elongated handle 315 of the pan 300 via the at least one node 319, and the various legs 232, 234, 332, 334 of the helper handles 230, 330 respectively. In a preferred embodiment, the perimetric edge 220, 320 of each cookware 200, 300, the node 319 on the elongated handle 315 of the pan 300, and the various legs 232, 234, 332, 334 of the helper handles 230, 330 respectively, are each similarly configured to accommodate the one or more notches 152, 154, 156 of the utensil 100, thereby enabling use of the utensil 100 in various positions relative to the pot 200 and/or pan 300. Furthermore, a variety of different cookware utensils embodying the notch system as shown, for example, in FIG. 16A (scoop), FIG. 16B (scraper), FIG. 16C (spatula) and FIG. 16D (ladle), may be independently or simultaneously utilized with different cookware as described herein. Other cookware utensil and notch configurations are contemplated, such as wherein the notches are on the front and/or back and/or side of the utensil handle.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

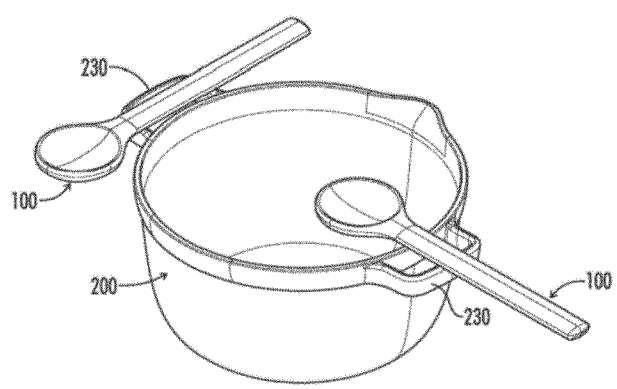
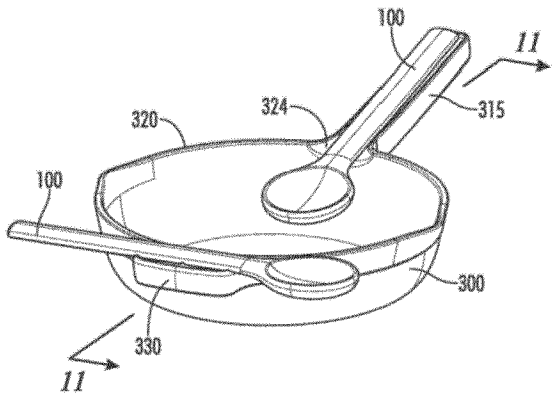

What is claimed is:

1. A cookware utensil system comprising:
   at least one cookware comprising a cookware body with a perimetric edge and at least one handle extending outwardly from the cookware body, the at least one handle comprising a handle grip connected to the cookware body by a pair of connector portions, wherein the handle grip is spaced from the perimetric edge by a first distance and the pair of connector portions are spaced from each other by a second distance, the second distance differing from the first distance; and
   a utensil having a plurality of notches, a first pair of the plurality of notches being spaced from each other by the first distance and a second pair of the plurality of notches being spaced from each other by the second distance that differs from the first distance;
   wherein the first pair of the plurality of notches is configured to simultaneously engage the perimetric edge and the handle grip and wherein the second pair of the plurality of notches is configured to simultaneously engage the pair of connector portions.

2. The cookware utensil system of claim 1, wherein the first pair of the plurality of notches is spaced to simultaneously engage the perimetric edge and the handle grip when the utensil is in a first orientation and wherein the second pair of the plurality of notches is spaced to simultaneously engage the pair of connector portions of the handle grip when the utensil is in a second orientation.

3. The cookware utensil system of claim 2, wherein the first orientation is generally orthogonal to the second orientation.

4. The cookware utensil system of claim 1, wherein the plurality of notches are equally spaced apart.

5. The cookware utensil system of claim 1, wherein the utensil has an upper surface and a lower surface and the plurality of notches are located on the lower surface.

6. The cookware utensil system of claim 1, wherein the plurality of notches comprises a first notch, a second notch, and a third notch, the first notch and the second notch being spaced apart by the first distance, the first notch and the third notch being spaced apart by the second distance.

7. The cookware utensil system of claim 1 further comprising an additional handle comprising at least one node that is configured to be engaged by at least one notch of the plurality of notches.

8. A cookware utensil system comprising:
   a cookware body having a perimetric edge and a handle spaced from the perimetric edge by a first distance, the handle comprising a second distance that differs from the first distance; and
   a utensil having a plurality of notches, a first pair of the plurality of notches being spaced from each other by the first distance and a second pair of the plurality of notches being spaced from each other by the second distance;
   wherein the first pair of the plurality of notches is configured to simultaneously engage the perimetric edge and the handle and wherein the second pair of the plurality of notches is configured to simultaneously engage the handle.

* * * * *

UNITED STATES PATENT AND TRADEMARK OFFICE
CERTIFICATE OF CORRECTION

| | | |
|---|---|---|
| PATENT NO. | : 11,700,973 B2 | |
| APPLICATION NO. | : 17/569600 | |
| DATED | : July 18, 2023 | |
| INVENTOR(S) | : Olsen et al. | |

It is certified that error appears in the above-identified patent and that said Letters Patent is hereby corrected as shown below:

On the Title Page

Delete the title page and substitute therefore with the attached title page.

In the Claims

Column 6, Line 64, add:

9. The cookware utensil system of claim 8 further comprising an additional handle comprising at least one node that is configured to be engaged by at least one notch of the plurality of notches.

10. The cookware utensil system of claim 8 wherein the plurality of notches comprises a first, second and third notch, the first and second notches being spaced apart by the first distance, the first and third notches being spaced apart by the second distance.

11. The cookware utensil system of claim 8, wherein the plurality of notches are equally spaced apart.

12. The cookware utensil system of claim 8 wherein the handle further comprises a handle grip connected to the cookware body by a pair of connector portions, wherein the pair of connector portions are spaced from each other by the second distance.

13. The cookware utensil system of claim 8, wherein the first pair of the plurality of notches is spaced to simultaneously engage the perimetric edge and the handle when the utensil is in a first orientation and wherein second pair of the plurality of notches is spaced to simultaneously engage the handle when the utensil is in a second orientation.

14. The cookware utensil system of claim 13, wherein the first orientation is generally perpendicular to the second orientation.

Signed and Sealed this
Fifth Day of November, 2024

Katherine Kelly Vidal
*Director of the United States Patent and Trademark Office*

15. The cookware utensil system of claim 8, wherein the plurality of notches are equally spaced apart.

16. The cookware utensil system of claim 8, wherein the utensil has an upper surface and a lower surface and the plurality of notches are located on the lower surface.

CERTIFICATE OF CORRECTION (continued)

(12) United States Patent
Olsen et al.

(10) Patent No.: US 11,700,973 B2
(45) Date of Patent: Jul. 18, 2023

(54) COOKWARE UTENSIL SYSTEM

(71) Applicant: Lagom Kitchen Co., Culver City, CA (US)

(72) Inventors: Melinda Olsen, Los Angeles, CA (US); Amir Tehrani, Los Angeles, CA (US); Zachary Rosner, Los Angeles, CA (US); Christopher Santone, Brooklyn, NY (US); Hlynur Atlason, New York, NY (US)

(73) Assignee: LAGOM KITCHEN CO., Culver City, CA (US)

( * ) Notice: Subject to any disclaimer, the term of this patent is extended or adjusted under 35 U.S.C. 154(b) by 0 days.

(21) Appl. No.: 17/569,600

(22) Filed: Jan. 6, 2022

(65) Prior Publication Data
US 2022/0322886 A1  Oct. 13, 2022

Related U.S. Application Data

(63) Continuation of application No. PCT/US2021/035497, filed on Jun. 2, 2021, which is a continuation-in-part of application No. 29/778,312, filed on Apr. 12, 2021.

(51) Int. Cl.
*A47J 43/28* (2006.01)
*A47G 21/04* (2006.01)

(52) U.S. Cl.
CPC ............ *A47J 43/287* (2013.01); *A47G 21/04* (2013.01)

(58) Field of Classification Search
CPC ....... A47J 43/287; A47G 21/04; A47G 21/14; A47G 21/145

USPC ....................... 248/213.2; 220/573.1
See application file for complete search history.

(56) References Cited

U.S. PATENT DOCUMENTS

| | | | |
|---|---|---|---|
| 721,249 A * | 2/1903 | Stimson | A47G 21/02 30/322 |
| 1,373,371 A | 3/1921 | Vierling et al. | |
| 1,403,274 A | 1/1922 | Springer | |
| 1,435,890 A | 11/1922 | Bothe | |
| D61,869 S | 2/1923 | Bothe | |
| D117,625 S | 11/1939 | Brandt | |
| D159,989 S | 9/1950 | Jones | |
| D234,017 S | 12/1974 | Christian et al. | |
| D238,316 S | 1/1976 | Kahn | |

(Continued)

FOREIGN PATENT DOCUMENTS

| | | |
|---|---|---|
| HK | 2118392-0001 | 7/2021 |
| WO | 2006/100367 A1 | 9/2006 |

(Continued)

OTHER PUBLICATIONS

International Search Report issued by the Russian Federal Institute of Industrial Property for corresponding International Patent Application No. PCT/US2021/035497, dated Nov. 25, 2021, with an English translation.

(Continued)

*Primary Examiner* — Andrew D Perreault
(74) *Attorney, Agent, or Firm* — Banner & Witcoff, Ltd.

(57) ABSTRACT

A cookware utensil system having at least one cookware further comprising a cookware body with a perimetric edge and at least one handle extending outwardly from the cookware body, and a utensil having at least one notch that is configured to engage with the at least one handle.

16 Claims, 8 Drawing Sheets